United States Patent
Yamada et al.

(10) Patent No.: US 9,815,972 B2
(45) Date of Patent: Nov. 14, 2017

(54) FLUORO-RUBBER COMPOSITION AND CROSS-LINKED RUBBER ARTICLE USING SAME

(71) Applicant: ASAHI GLASS COMPANY, LIMITED, Tokyo (JP)

(72) Inventors: Takeshi Yamada, Tokyo (JP); Ken Iruya, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 14/642,885

(22) Filed: Mar. 10, 2015

(65) Prior Publication Data
US 2015/0175779 A1    Jun. 25, 2015

Related U.S. Application Data

(63) Continuation of application No. PCT/JP2013/081072, filed on Nov. 18, 2013.

(30) Foreign Application Priority Data

Nov. 29, 2012    (JP) ................. 2012-260956

(51) Int. Cl.
| | |
|---|---|
| *C08L 83/08* | (2006.01) |
| *C08K 9/06* | (2006.01) |
| *C08K 5/34* | (2006.01) |
| *C08K 5/3477* | (2006.01) |
| *C08K 3/04* | (2006.01) |
| *C08K 5/14* | (2006.01) |
| *C08K 5/3492* | (2006.01) |
| *C09K 3/10* | (2006.01) |

(52) U.S. Cl.
CPC .............. *C08K 9/06* (2013.01); *C08K 3/04* (2013.01); *C08K 5/14* (2013.01); *C08K 5/34* (2013.01); *C08K 5/3477* (2013.01); *C08K 5/34924* (2013.01); *C08L 83/08* (2013.01); *C09K 3/1009* (2013.01)

(58) Field of Classification Search
CPC .......... C08L 27/12; C08L 27/14; C08L 27/16; C08L 27/18; C08L 27/20; C08K 9/06
USPC ................. 524/424, 492, 493; 428/403, 405
See application file for complete search history.

(56) References Cited

U.S. PATENT DOCUMENTS

| | | | | |
|---|---|---|---|---|
| 5,955,530 A  * | 9/1999 | Inoue | ..................... | C09D 5/033 |
| | | | | 524/492 |
| 2001/0000788 A1 | 5/2001 | Ono et al. | | |
| 2004/0220293 A1 | 11/2004 | Kuzawa et al. | | |
| 2005/0106967 A1* | 5/2005 | Suzuki | ..................... | B32B 27/12 |
| | | | | 442/86 |
| 2006/0100343 A1* | 5/2006 | Osawa | .................... | C08L 71/02 |
| | | | | 524/492 |
| 2006/0293432 A1 | 12/2006 | Hirano et al. | | |
| 2007/0149714 A1* | 6/2007 | Adair | ...................... | C08F 14/18 |
| | | | | 525/326.2 |
| 2010/0311868 A1* | 12/2010 | Bekiarian | .............. | B82Y 30/00 |
| | | | | 523/218 |
| 2016/0230021 A1* | 8/2016 | Yoshino | ................. | C09D 5/031 |

FOREIGN PATENT DOCUMENTS

| | | |
|---|---|---|
| JP | 05-140402 | 6/1993 |
| JP | 11/172231 | 6/1999 |
| JP | 2000-006317 | 1/2000 |
| JP | 2004-292486 | 10/2004 |
| JP | 2006-316112 | 11/2006 |
| JP | 2007-84832 A | 4/2007 |
| JP | 2009-126875 A | 6/2009 |
| JP | 2012-512264 A | 5/2012 |
| WO | WO 2009/119381 A1 | 10/2009 |
| WO | WO 2012/073977 A1 | 6/2012 |

OTHER PUBLICATIONS

Product data sheet for Aerosil R812S (no date).*
Evonik Hydrophobic Aerosil Fumed Silica data sheet (no date).*
Evonik Aerosil R 972 hydrophobic fumed silica material data sheet (no date).*
International Search Report issued in International Application No. PCT/JP2013/081072, dated Nov. 18, 2013.

* cited by examiner

*Primary Examiner* — Marc Zimmer
(74) *Attorney, Agent, or Firm* — Oblon, McClelland, Maier & Neustadt, L.L.P.

(57) ABSTRACT

To provide a fluoro-rubber composition whereby good hardness and good elongation are obtainable in a rubber article after cross-linking, and a cross-linked rubber article using the same.
A fluoro-rubber composition comprising a fluoro-rubber, a hydrophobic silica and a cross-linking agent, wherein the hydrophobic silica is one having hydrophobized with hexamethyldisilazane or silicone oil, and the content of the hydrophobic silica is from 1 to 50 parts by mass and the content of the cross-linking agent is from 0.1 to 5 parts by mass, per 100 parts by mass of the fluoro-rubber; and a cross-linked rubber article obtained by cross-linking such a fluoro-rubber composition.

19 Claims, No Drawings

FLUORO-RUBBER COMPOSITION AND CROSS-LINKED RUBBER ARTICLE USING SAME

TECHNICAL FIELD

The present invention relates to a fluoro-rubber composition and a cross-linked rubber article obtainable by using such a fluoro-rubber composition.

BACKGROUND ART

In a rotary drilling rig to be used for oil-well drilling, a bit (blade) is mounted on the forward end of a drilling pipe, and it is rotated at a high speed for drilling. The drilling portion is exposed to a high temperature, high pressure and acidic atmosphere, and therefore, a drilling member is required to have heat resistance, acid resistance and high strength.

Therefore, fluoro-rubber is used for a rubber member for oil-well drilling, such as a sealing material at a joint portion of an oil-well drilling pipe. Particularly, a tetrafluoroethylene/propylene copolymer is preferably used as a rubber material excellent in heat resistance, acid resistance and oil resistance.

However, along with the progress in drilling technology, abrasion resistance higher than ever has also been required. Therefore, a highly hard fluoro-rubber has now been required as a material for a rubber member for oil-well drilling.

Patent Document 1 discloses a method wherein a rubber composition comprising raw material rubber made of a tetrafluoroethylene/propylene copolymer and silica having its surface hydrophobized, is molded, followed by irradiation with γ-rays to produce a fluoro-rubber molded product. In Examples, as the fluoro-rubber, a tetrafluoroethylene/propylene copolymer, and as the hydrophobized silica, AEROSIL R202, manufactured by Nippon Aerosil Co., Ltd., are used.

Patent Document 2 discloses a hose made of a laminate of a fluoro-rubber layer and an acrylic rubber layer. The fluoro-rubber layer is formed by a method wherein a fluoro-rubber composition comprising fluoro-rubber, carbon black, a silica-type filler, an organic peroxide and a cross-linking assistant, is molded, followed by steam vulcanization and hot air vulcanization. In Examples, as the fluoro-rubber, a tetrafluoroethylene/propylene binary copolymer, and as the silica-type filler, AEROSIL R972, manufactured by Nippon Aerosil Co., Ltd., are used.

PRIOR ART DOCUMENTS

Patent Documents

Patent Document 1: JP-A-2004-292486
Patent Document 2: JP-A-2000-006317

DISCLOSURE OF INVENTION

Technical Problem

In the method disclosed in Patent Document 1, as shown by Examples 1 and 2 and Comparative Examples 3 and 4 in Table 1 in paragraph [0023] of the Document, when the amount of the hydrophobized silica to be added, is increased, the hardness of the molded product after cross-linking with γ-rays is improved, but the elongation decreases. In a rubber article, a decrease in elongation is undesirable, and a rubber article having high strength and high elongation is desired.

Further, according to findings by the present inventors, even if a fluoro-rubber composition is prepared and then cross-linked to obtain a rubber article by the method disclosed in Patent Document 2, it is not possible to obtain one which is necessarily sufficient from the viewpoint of satisfying both high hardness and high elongation.

The present invention has been made in view of the above circumstances, and it is an object of the present invention to provide a fluoro-rubber composition whereby good hardness and good elongation are obtainable in a rubber article after cross-linking, and a cross-linked rubber article obtainable by using such a fluoro-rubber composition.

Solution to Problem

The present invention provides a fluoro-rubber composition and a cross-linked rubber article, having the following constructions.

[1] A fluoro-rubber composition comprising a fluoro-rubber, a hydrophobic silica and a cross-linking agent, wherein the hydrophobic silica is one having hydrophobized with hexamethyldisilazane or silicone oil, and the content of the hydrophobic silica is from 1 to 50 parts by mass and the content of the cross-linking agent is from 0.1 to 5 parts by mass, per 100 parts by mass of the fluoro-rubber.
[2] The fluoro-rubber composition according to the above [1], wherein the hydrophobic silica is one having hydrophobized with hexamethyldisilazane.
[3] The fluoro-rubber composition according to the above [1] or [2], wherein the hydrophobic silica has an apparent specific gravity of from 40 to 250 g/L.
[4] The fluoro-rubber composition according to any one of the above [1] to [3], wherein the hydrophobic silica has an average primary particle size of from 5 to 50 nm.
[5] The fluoro-rubber composition according to any one of the above [1] to [4], wherein the hydrophobic silica has a specific surface area of from 15 to 410 $m^2/g$.
[6] The fluoro-rubber composition according to any one of the above [1] to [5], wherein the cross-linking agent is an organic peroxide.
[7] The fluoro-rubber composition according to any one of the above [1] to [6], wherein the fluoro-rubber is at least one member selected from the group consisting of a vinylidene fluoride/hexafluoropropylene copolymer, a tetrafluoroethylene/propylene copolymer, a vinylidene fluoride/tetrafluoroethylene/hexafluoropropylene copolymer and a tetrafluoroethylene/propylene/vinylidene fluoride copolymer.
[8] The fluoro-rubber composition according to Claim 7, wherein the fluoro-rubber is a tetrafluoroethylene/propylene copolymer.
[9] The fluoro-rubber composition according to any one of the above [1] to [8], which further contains a cross-linking assistant in an amount of from 0.1 to 30 parts by mass per 100 parts by mass of the fluoro-rubber.
[10] The fluoro-rubber composition according to Claim 9, wherein the cross-linking assistant is at least one member selected from the group consisting of triallyl cyanurate, triallyl isocyanurate and trimethallyl isocyanurate.
[11] The fluoro-rubber composition according to any one of the above [1] to [10], which further contains carbon black in an amount of from 1 to 50 parts by mass per 100 parts by mass of the fluoro-rubber.

[12] A cross-linked rubber article obtained by cross-linking the fluoro-rubber composition as defined in any one of the above [1] to [11].
[13] The cross-linked rubber article according to Claim 12, which is a rubber member for oil drilling.

Advantageous Effects of Invention

According to the fluoro-rubber composition of the present invention, good hardness and good elongation are obtainable in a rubber article after cross-linking.

The cross-linked rubber article of the present invention has good hardness and good elongation.

DESCRIPTION OF EMBODIMENTS

In this specification, a value of the apparent specific gravity of the hydrophobic silica is a value obtainable by ISO787/XI.

In this specification, a value of the specific surface area of the hydrophobic silica is a value obtainable by the BET method as stipulated in ISO18852 (JIS K6430 (2008)).

In this specification, a value of the average primary particle size of the hydrophobic silica is a value obtainable by a transmission electron microscope observation. That is, the average primary particle size is obtained by measuring the particle sizes of at least 2,500 particles by a transmission electron microscope, followed by number averaging.

The fluoro-rubber composition of the present invention comprises a fluoro-rubber, a hydrophobic silica and a cross-linking agent.

<Fluoro-Rubber>

In the present invention, the fluorine content in the fluoro-rubber is preferably from 40 mass % to 75 mass %, more preferably from 45 mass % to 75 mass %, most preferably from 50 mass % to 75 mass %. When the fluorine content is within the above range, a cross-linked article excellent in heat resistance, acid resistance, oil resistance, chemical resistance, electrical insulating properties and steam resistance, is readily obtainable. The fluorine content in the fluoro-rubber is the proportion of the total mass of all fluorine atoms to the total mass of the fluoro-rubber.

Specific examples of the fluoro-rubber may be a tetrafluoroethylene/propylene copolymer, a tetrafluoroethylene/propylene/vinylidene fluoride copolymer, a tetrafluoroethylene/propylene/vinyl fluoride copolymer, a tetrafluoroethylene/propylene/trifluoroethylene copolymer, a tetrafluoroethylene/propylene/pentafluoropropylene copolymer, a tetrafluoroethylene/propylene/chlorotrifluoroethylene copolymer, a tetrafluoroethylene/propylene/ethylidene norbornene copolymer, a vinylidene fluoride/hexafluoropropylene copolymer, a vinylidene fluoride/tetrafluoroethylene/hexafluoropropylene copolymer, a vinylidene fluoride/chlorotrifluoroethylene copolymer, a hexafluoropropylene/ethylene copolymer, a tetrafluoroethylene/perfluoro(alkyl vinyl ether) copolymer, a vinylidene fluoride/tetrafluoroethylene/perfluoro(alkyl vinyl ether) copolymer, etc.

Among them, at least one member selected from the group consisting of (1) a tetrafluoroethylene/propylene copolymer, (2) a vinylidene fluoride/hexafluoropropylene copolymer, (3) a vinylidene fluoride/tetrafluoroethylene/hexafluoropropylene copolymer and (4) a tetrafluoroethylene/propylene/vinylidene fluoride copolymer, is preferred from the viewpoint of heat resistance and oil resistance.

Particularly, from the viewpoint of $H_2S$ gas resistance, a tetrafluoroethylene/propylene copolymer is more preferred.

The copolymerization composition of (1) the tetrafluoroethylene/propylene copolymer is preferably from 40/60 to 70/30 (molar ratio), more preferably from 45/55 to 65/35 (molar ratio), most preferably from 50/50 to 60/40 (molar ratio).

The tetrafluoroethylene/propylene copolymer preferably satisfies a Mooney viscosity (100° C.) of at least 30 and less than 170 and has a glass transition temperature (TG) of at least −5° C. and at most 25° C. Or, in a case where the Mooney viscosity is not measurable, it preferably satisfies a storage shear elastic modulus G' of at least 70 and at most 600 and has a glass transition temperature (TG) of at least −5° C. and at most 25° C. It more preferably satisfies a storage shear elastic modulus G' of at least 400 and at most 600 and has a glass transition temperature (TG) of at least −5° C. and at most 25° C.

In this specification, a value of the Mooney viscosity (100° C.) (hereinafter sometimes referred to simply as the Mooney viscosity) is a value obtainable by measurement in accordance with JIS K6300 using a large rotor having a diameter of 38.1 mm and a thickness of 5.54 mm and by setting the preheating time to be 1 minute at 100° C. and the rotor rotating time to be 4 minutes. The larger the value of the Mooney viscosity, the higher the molecular weight.

In this specification, a value of the storage shear elastic modulus G' (hereinafter sometimes referred to simply as G') is a value obtainable by measurement at a temperature of 100° C. with an amplitude of 0.5 degree at a vibration frequency of 50 times/min. in accordance with ASTM D5289 and D6204 using a viscoelasticity measuring apparatus (trade name: RPA2000) manufactured by Alpha Technology Co., Ltd. The larger the value of G', the higher the molecular weight.

A tetrafluoroethylene/propylene copolymer satisfying such physical properties is available from commercial products, and it is preferred to select it for use from those commercially available particularly for cross-linking (vulcanization) using a peroxide.

For example, those with the following grades of AFLAS series manufactured by Asahi Glass Co., Ltd. may be mentioned. As specific trade names, AFLAS100H (G'=500), AFLAS100S (Mooney viscosity=115), AFLAS150P (Mooney viscosity=70), AFLAS150E (Mooney viscosity=45), and AFLAS150L (storage shear elastic modulus G'=80) may be mentioned. Each of them has a fluorine content of 57 mass % and a glass transition temperature of −3° C.

The copolymerization composition of (2) the vinylidene fluoride/hexafluoropropylene copolymer is preferably from 60/40 to 95/5 (molar ratio), more preferably from 70/30 to 90/10 (molar ratio), most preferably from 75/25 to 85/15 (molar ratio).

Commercial products of the vinylidene fluoride/hexafluoropropylene copolymer may, for example, be DAIEL G701 (trade name) manufactured by Daikin Industries Ltd., Viton A401C (trade name) manufactured by DuPont Dow Elastomers, Dyneon FE-5620Q (trade name) manufactured by Sumitomo 3M Limited, etc.

The copolymerization composition of (3) the vinylidene fluoride/tetrafluoroethylene/hexafluoropropylene copolymer is preferably from 50/5/45 to 65/30/5 (molar ratio), more preferably from 50/15/35 to 65/25/10 (molar ratio), most preferably from 50/20/30 to 65/20/15 (molar ratio).

Commercial products of the vinylidene fluoride/tetrafluoroethylene/hexafluoropropylene copolymer may, for example, be DAIEL G621 (trade name) manufactured by Daikin Industries Ltd., Viton B601C (trade name) manufactured by DuPont Dow Elastomers, Dyneon FE-5840Q (trade name) manufactured by Sumitomo 3M Limited, etc.

The copolymerization composition of (4) the tetrafluoroethylene/propylene/vinylidene fluoride copolymer is preferably from 35/15/50 to 55/44/1 (molar ratio), more preferably from 35/17/48 to 55/44/1 (molar ratio), most preferably from 35/20/45 to 55/44/1 (molar ratio).

A commercial product of the tetrafluoroethylene/propylene/vinylidene fluoride copolymer may, for example, be AFLAS200P (trade name) manufactured by Asahi Glass Co., Ltd.

<Cross-Linking Agent>

As the cross-linking agent in the present invention, a known cross-linking agent may suitably be used. Particularly, it is preferred to use an organic peroxide, in that a cross-linked article excellent in steam resistance is thereby readily obtainable.

The organic peroxide may be one which generates radicals under heating or in the presence of a redox system, and one mainly used as a polymerization initiator, curing agent or cross-linking agent for a resin or synthetic rubber, may be used. Usually, an organic peroxide is a derivative of hydrogen peroxide and, since an oxygen bond is present in its molecule, it is thermally decomposed at a relatively low temperature to readily form free radicals. As reactions to be caused by the formed free radicals, an addition reaction to an unsaturated double bond and a reaction to withdraw hydrogen, etc., may be mentioned. By utilizing the latter hydrogen-withdrawing reaction among these reactions, it is used, for example, as a cross-linking agent or cross-linking accelerator for various synthetic rubbers or synthetic resins or as a modifier for polypropylenes. As organic peroxides to be used for cross-linking for synthetic rubbers, etc., various types of organic peroxides are available, and suitable selection for use is desired in order to avoid decomposition or scorching due to heat history during kneading of a rubber composition and in order to carry out the cross-linking satisfactorily at a predetermined cross-linking temperature and within a predetermined time. One of such organic peroxides may be used alone, or two or more of them may be used in combination.

The organic peroxide is preferably one, of which the temperature at which its half-life period becomes 1 minute, is from 130 to 220° C.

Specific examples of such preferred one include 1,1-bis(t-hexylperoxy)-3,5,5-trimethylcylohexane, 2,5-dimethylhexane-2,5-dihydroperoxide, di-t-butyl peroxide, t-butyl cumyl peroxide, dicumyl peroxide, α,α'-bis(t-butylperoxy)-p-diiospropylbenzene, 2,5-dimethyl-2,5-di(t-butylperoxy)-hexane, 2,5-dimethyl-2,5-di(t-butylperoxy)-hexyne-3, dibenzoyl peroxide, t-butyl peroxybenzoate, 2,5-dimethyl-2,5-di(benzoylperoxy)hexane, t-butyl peroxymaleic acid, t-hexyl peroxyisopropyl monocarbonate, etc.

Among them, α,α'-bis(t-butylperoxy)-p-diiospropylbenzene is more preferred in that it is excellent in the cross-linking properties for fluoro-rubber.

The content of the cross-linking agent in the fluoro-rubber composition is from 0.1 to 5 parts by mass, preferably from 0.2 to 4 parts by mass, more preferably from 0.5 to 3 parts by mass, per 100 parts by mass of the fluoro-rubber. Within such a range, high cross-linking effects are readily obtainable, and it is easy to prevent the production of inactive decomposition products.

<Hydrophobic Silica>

The hydrophobic silica is one having non-treated silica hydrophobized with a surface treating agent.

In the present invention, a hydrophobic silica having hydrophobized with hexamethyldisilazane or silicone oil as the surface treating agent is employed. The silica having hydrophobized with such a specific surface treating agent is excellent in effects to improve the hardness while preventing a decrease in the elongation of a cross-linked rubber article. Further, when such a specific hydrophobic silica is used, it is possible to readily prevent a decrease in the fluidity by the addition of the hydrophobic silica to a fluoro-rubber composition, and thus to obtain good molding processability.

Particularly preferred is a hydrophobic silica having hydrophobized with hexamethyldisilazane as the surface treating agent, since it is thereby possible to more readily prevent a decrease in the elongation.

Non-treated silica before being subjected to hydrophobization is usually wet silica or dry silica depending upon the method for its preparation. If wet silica is contained in a fluoro-rubber composition, a defect such as formation of voids is likely to result during a molding process, and therefore, it is preferred to use dry silica. From such a viewpoint, the hydrophobic silica is preferably one having dry silica hydrophobized.

The apparent specific gravity of the hydrophobic silica is preferably from 40 to 250 g/L, more preferably from 100 to 200 g/L. Particularly within such a range, a decrease in fluidity of the fluoro-rubber composition is small, a decrease in the elongation of the cross-linked article is small, and the effect to improve the hardness is excellent.

The specific surface area of the hydrophobic silica is preferably from 15 to 410 $m^2/g$, more preferably from 20 to 300 $m^2/g$, particularly preferably from 25 to 200 $m^2/g$. Within such a range, good dispersibility in the fluoro-rubber composition is readily obtainable.

The average primary particle size of the hydrophobic silica is preferably from 5 to 50 nm, more preferably from 6 to 45 nm, particularly preferably from 7 to 40 nm. Within such a range, good dispersibility in the fluoro-rubber composition is readily obtainable.

Such a hydrophobic silica is available from commercial products, and for example, it may be selected for use from Aerosil series manufactured by Nippon Aerosil Co., Ltd. As specific examples, those used in Examples given hereinafter may be mentioned.

The content of the hydrophobic silica in the fluoro-rubber composition is from 1 to 50 parts by mass, preferably from 10 to 45 parts by mass, more preferably from 20 to 40 parts by mass, per 100 parts by mass of the fluoro-rubber.

When the content of the hydrophobic silica is at least 1 part by mass, the effect to improve the hardness is readily obtainable, and when it is at most 50 parts by mass, good elongation is readily obtainable in a cross-linked rubber article.

<Cross-Linking Assistant>

It is also preferred to incorporate a cross-linking assistant to the fluoro-rubber composition. As such a cross-linking assistant, a known one may suitably be employed.

Specific examples may be triallyl cyanurate, triallyl isocyanurate, triacryl formal, triallyl trimellitate, dipropargyl terephthalate, diallyl phthalate, tetraallyl terephthalamide, triallyl phosphate, trimethallyl isocyanurate, 1,3,5-triacryloylhexahydro-1,3,5-triazine, m-phenylenediamine bismaleimide, p-quinone dioxime, p,p'-dibenzoylquinone dioxime, dipropargyl terephthalate, N,N',N'',N'''-tetraallyl terephthalamide, a vinyl group-containing siloxane oligomer such as polymethyl vinyl siloxane or polymethylphenyl vinyl siloxane, etc.

One of such cross-linking assistants may be used alone, or two or more of them may be used in combination.

Among them, at least one member selected from the group consisting of triallyl cyanurate, triallyl isocyanurate and trimethallyl isocyanurate is preferred, and triallyl isocyanurate is more preferred, from the viewpoint of cross-linking efficiency.

The content of the cross-linking assistant in the fluoro-rubber composition is preferably from 0.1 to 30 parts by mass, more preferably from 1 to 20 parts by mass, further preferably from 3.5 to 10 parts by mass, per 100 parts by mass of the fluoro-rubber. When the content is at least the lower limit value in the above range, a good cross-linking rate is readily obtainable, and a good cross-linking degree is readily attainable. When it is at most the upper limit value in the above range, good physical properties such as elongation, etc. are readily obtainable.

<Carbon Black>

It is also preferred to incorporate carbon black to the fluoro-rubber composition. Carbon black has an effect to reinforce a cross-linked rubber.

Such carbon black is not particularly limited, and one which is commonly employed as a filler for rubber may be used. One type may be used alone, or two or more types may be used in combination.

Specific examples may be furnace black, acetylene black, thermal black, channel black, graphite, etc. Among them, from the viewpoint of reinforcing properties, furnace black or thermal black is preferred, and specific examples thereof may be HAF-LS, HAF, HAF-HS, FEF, GPF, APF, SRF-LM, SRF-HM, MT, etc.

The content of carbon black in the fluoro-rubber composition is preferably from 1 to 50 parts by mass, more preferably from 5 to 50 parts by mass, per 100 parts by mass of the fluoro-rubber. When the content is at least the lower limit value in the above range, the effect to improve the hardness is sufficiently obtainable, and when it is at most the upper limit value, good elongation is readily obtainable in a cross-linked rubber article.

<Other Additives>

As other additives, known components such as a filler other than carbon black, a processing assistant, a slip additive, a lubricant, a flame retardant, an antistatic agent, a colorant, etc. may suitably incorporated to the fluoro-rubber composition.

The filler other than carbon black may, for example, be a fluoro-resin such as polytetrafluoroethylene or an ethylene/tetrafluoroethylene copolymer, glass fiber, carbon fiber or white carbon.

The content of the filler other than carbon black in the fluoro-rubber composition is preferably from 5 to 200 parts by mass, more preferably from 10 to 100 parts by mass, per 100 parts by mass of the fluoro-rubber.

The processing assistant may, for example, be an alkali metal salt of a higher fatty acid. For example, a stearate or a laurate is preferred.

The content of the processing assistant in the fluoro-rubber composition is preferably from 0.1 to 20 parts by mass, more preferably from 0.2 to 10 parts by mass, further preferably from 1 to 5 parts by mass, per 100 parts by mass of the fluoro-rubber.

<Method for Producing Fluoro-Rubber Composition>

The method for producing the fluoro-rubber composition of the present invention is not particularly limited, and a known method may suitably be employed.

As a specific example, preferred is a method of kneading the fluoro-rubber, the cross-linking agent, the hydrophobic silica and, as the case requires, a cross-linking assistant, carbon black and other additives, by means of a kneading machine such as a twin roll, a Banbury mixer or a kneader. Further, a method of mixing them in such a state as dissolved or dispersed in a solvent may also be employed.

The order for addition of the respective components is not particularly limited, but it is preferred that firstly a filler and other additives as components hardly reactive or decomposable by heat generation during kneading, are sufficiently kneaded with the fluoro-rubber and then, a cross-linking agent as a readily reactive or decomposable component is added and kneaded. During the kneading, it is preferred to cool the kneading machine with water to maintain the temperature at a level of at most 120° C. where the organic peroxide is less likely to be decomposed.

<Method for Producing Cross-Linked Rubber Article>

A cross-linked rubber article is obtainable by cross-linking the fluoro-rubber composition of the present invention. Specifically, it is formed in a desired shape and cross-linked. The forming method or the cross-linking method is not particularly limited, and a known technique may suitably be employed in a method for cross-linking by means of a cross-linking agent.

As the cross-linking method, hot press cross-linking, steam cross-linking, hot air cross-linking or lead-covered cross-linking may, for example, be employed in consideration of the forming method and the shape of a cross-linked rubber article.

With respect to the cross-linking conditions, a method of heating e.g. at from 100 to 400° C. for from a few seconds to 24 hours, may, for example, be employed. Further, it is also preferred to carry out secondary cross-linking for the purpose of improving the mechanical properties, improving the compression permanent strain or stabilizing other properties of the cross-linked rubber article. With respect to the secondary cross-linking conditions, it is possible to employ a method of heating e.g. at from 100 to 300° C. for from 30 minutes to 48 hours.

According to the present invention, as shown in Examples given hereinafter, in the method for producing a cross-linked rubber article by cross-linking a fluoro-rubber with a cross-linking agent, it is possible to obtain a cross-linked rubber article having high hardness and high elongation, by incorporating a hydrophobic silica hydrophobized with a specific surface treating agent to a fluoro-rubber composition before cross-linking.

The hardness, as measured by the after-mentioned measuring method, of the cross-linked rubber article of the present invention, is preferably from 75 to 99°, more preferably from 80 to 99°, further preferably from 85 to 99°, particularly preferably from 87 to 93°.

The elongation, as measured by the after-mentioned measuring method, of the cross-linked rubber article of the present invention, is preferably at least 200%, more preferably at least 220%, particularly preferably at least 250%. The upper limit is not particularly limited, but is usually at most 500%.

However, of a highly hard cross-linked rubber article having a hardness of at least 95°, the elongation is preferably at least 150%, more preferably at least 160%, particularly preferably at least 170%. The upper limit is not particularly limited, but is usually at most 400%.

The tensile strength (strength), as measured by the after-mentioned measuring method, of the cross-linked rubber article of the present invention, is preferably at least 15 MPa, more preferably at least 17 MPa, particularly preferably at least 20 MPa. The upper limit is not particularly limited, but is usually at most 40 MPa.

The minimum torque value (ML), as measured by the after-mentioned measuring method, as an index for the molding processability (fluidity) of the fluoro-rubber composition of the present invention, is preferably from 1 to 25 dNm, more preferably from 5 to 20 dNm, particularly preferably from 10 to 18 dNm. If the minimum torque value (ML) is too high, the fluidity at the time of cross-linking is poor.

Particularly, according to the present invention, it is possible to realize a cross-linked rubber article having a hardness of at least 80° and an elongation of at least 250%.

EXAMPLES

Now, the present invention will be described in further detail with reference to Examples, but it should be understood that the present invention is by no means limited to such Examples.

<Measuring Methods>

[Tensile Strength, Elongation]

In accordance with JIS K6251, a test piece obtained from a sheet-form cross-linked rubber article having a thickness of 2 mm by punching out in a No. 3 dumbbell shape, was subjected to a tensile test at room temperature by means of Quick Reader, trade name, manufactured by Ueshima Seisakusho Co., Ltd., whereby the breaking strength and the elongation at break were measured.

[Hardness]

In accordance with JIS K6253, by overlaying three sheets of a sheet-form cross-linked rubber article having a thickness of 2 mm, the hardness was measured by means of Durometer Type A at 23° C.

[Minimum Torque Value (ML)]

By means of a viscoelasticity measuring device (trade name: RPA-2000, manufactured by Alpha Technology Inc.), the minimum torque value (ML) (unit: dNm) was measured under conditions of 177° C. for 12 minutes with an amplitude of 3 degrees.

Various components used in the following Examples are as follows.

(1) Fluoro-Rubber 1:

Tetrafluoroethylene/propylene copolymer (manufactured by Asahi Glass Co., Ltd., trade name: AFLAS100H, copolymerization composition (molar ratio) of tetrafluoroethylene/propylene=55/45, fluorine content=57 mass %, Mooney viscosity (121° C.): not measurable, storage shear elastic modulus G'=500, glass transition temperature=−3° C.)

(2) Cross-Linking Agent 1:

α,α'-bis(t-butylperoxy)-p-diisopropylbenzene (manufactured by Kayaku Akzo Corporation, trade name: Perkadox 14R-P)

(3) Cross-Linking Assistant 1:

Triallyl isocyanurate (TAIC) (manufactured by Nippon Kasei Chemical Co., Ltd.)

(4) Processing Assistant 1:

Calcium stearate (manufactured by Kishida Chemical Co., Ltd.)

(5) Fillers:

Silica 1 (hydrophobic silica): Manufactured by Nippon Aerosil Co., Ltd., trade name: Aerosil R8200, (surface treating agent: hexamethyldisilazane, apparent specific gravity: 140 g/L, average primary particle size: 12 nm, specific surface area: 160±25 m$^2$/g)

Silica 2 (hydrophobic silica): Manufactured by Nippon Aerosil Co., Ltd., trade name: Aerosil RX200, (surface treating agent: hexamethyldisilazane, apparent specific gravity: 50 g/L, average primary particle size: 12 nm, specific surface area: 140±25 m$^2$/g)

Silica 3 (hydrophobic silica): Manufactured by Nippon Aerosil Co., Ltd., trade name: Aerosil NX90S, (surface treating agent: hexamethylsilazane, apparent specific gravity: 40 g/L, average primary particle size: 20 nm, specific surface area: 65±15 m$^2$/g)

Silica 4 (hydrophobic silica): Manufactured by Nippon Aerosil Co., Ltd., trade name: Aerosil R202, (surface treating agent: silicone oil, apparent specific gravity: 60 g/L, average primary particle size: 14 nm, specific surface area: 100±20 m$^2$/g)

Silica 5 (hydrophobic silica): Manufactured by Nippon Aerosil Co., Ltd., trade name: Aerosil R972, (surface treating agent: dimethyldichlrosilane, apparent specific gravity: 50 g/L, average primary particle size: 16 nm, specific surface area: 110±20 m$^2$/g)

Silica 6 (hydrophobic silica): Manufactured by Nippon Aerosil Co., Ltd., trade name: Aerosil R9200, (surface treating agent: dimethyldichlrosilane, apparent specific gravity: 200 g/L, average primary particle size: 12 nm, specific surface area: 170±20 m$^2$/g)

Silica 7 (hydrophilic silica): Manufactured by Nippon Aerosil Co., Ltd., trade name: Aerosil 200, (no surface treating agent, apparent specific gravity: 50 g/L, average primary particle size: 12 nm, specific surface area: 200±25 m$^2$/g)

Carbon black 1: Manufactured by Tokai Carbon Co., Ltd., trade name: SEAST SO (FEF carbon)

Carbon black 2: Manufactured by Tokai Carbon Co., Ltd., trade name: SEAST 3 (HAF carbon)

Carbon black 3: Manufactured by Tokai Carbon Co., Ltd., trade name: SEAST S (SRF carbon)

Carbon black 4: Manufactured by Tokai Carbon Co., Ltd., trade name: SEAST 116 (MAF carbon)

Ex. 1 to 12

Components for the composition shown in Table 1 were kneaded for 10 minutes by an open roll mill to prepare a fluoro-rubber composition. With respect to the obtained fluoro-rubber composition, the minimum torque value (ML) was measured by the above-described method. The results are shown in Table 1.

Then, the obtained fluoro-rubber composition was set on a die heated at 170° C. and held at 170° C. for 20 minutes by means of a hot pressing device and thereby cross-linked. Then, the die was taken out from the hot pressing device, and the formed product (sheet having a thickness of 2 mm) was removed from the die. The obtained formed product (sheet) was heated at 200° C. for 4 hours in an air atmosphere by means of an electrical furnace for secondary cross-linking treatment to obtain a sheet-form cross-linked article having a thickness of 2 mm.

With respect to the obtained cross-linked rubber article, the hardness, the tensile strength and the elongation were measured by the above-described methods. The results are shown in Table 1.

TABLE 1

|  |  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|---|
| Composition (parts by mass) | Fluoro-rubber 1 | 100 | 100 | 100 | 100 | 100 | 100 | 100 | 100 | 100 | 100 | 100 | 100 |
| | Silica 1 | — | 30 | 20 | 40 | 50 | 20 | — | — | — | — | — | — |
| | Silica 2 | — | — | — | — | — | — | 30 | — | — | — | — | — |
| | Silica 3 | — | — | — | — | — | — | — | 30 | — | — | — | — |
| | Silica 4 | — | — | — | — | — | — | — | — | 30 | — | — | — |
| | Silica 5 | — | — | — | — | — | — | — | — | — | 30 | — | — |
| | Silica 6 | — | — | — | — | — | — | — | — | — | — | 30 | — |
| | Silica 7 | — | — | — | — | — | — | — | — | — | — | — | 30 |
| | Carbon black 3 | 20 | — | — | — | — | — | — | — | — | — | — | — |
| | Carbon black 4 | 20 | — | — | — | — | — | — | — | — | — | — | — |
| | Carbon black 1 | 20 | — | 5 | — | — | — | — | — | — | — | — | — |
| | Carbon black 2 | — | — | 5 | — | — | — | — | — | — | — | — | — |
| | Cross-linking assistant 1 | 5 | 5 | 5 | 5 | 5 | 5 | 5 | 5 | 5 | 5 | 5 | 5 |
| | Processing assistant 1 | 1 | 1 | 1 | 1 | 1 | 1 | 1 | 1 | 1 | 1 | 1 | 1 |
| | Cross-linking agent 1 | 1 | 1 | 1 | 1 | 1 | 1 | 1 | 1 | 1 | 1 | 1 | 1 |
| Evaluation | Minimum torque value ML (dNm) | 17.0 | 17.0 | 17.9 | 20.0 | 20.2 | 17.9 | 19.5 | 18.3 | 19.6 | 19.0 | 23.5 | 44.0 |
| | A hardness (°) | 91 | 88 | 87 | 95 | 97 | 82 | 90 | 87 | 89 | 88 | 90 | 91 |
| | Tensile strength (MPa) | 21.9 | 23.2 | 23.4 | 21.3 | 19.2 | 22.0 | 24.1 | 20.9 | 20.4 | 21.6 | 24.6 | 28.6 |
| | Elongation (%) | 90 | 300 | 260 | 220 | 170 | 310 | 250 | 255 | 255 | 230 | 200 | 180 |

As shown by the results in Table 1, in Ex. 1 wherein no hydrophobic silica was incorporated in the fluoro-rubber composition and carbon blacks were incorporated as much as 60 parts by mass in total, the hardness is good, but the elongation is very low.

Further, in Ex. 12 wherein no hydrophobic silica was incorporated in the fluoro-rubber composition and hydrophilic silica (silica 7) was added, by the addition of 30 parts by mass, the hardness equal to Ex. 1 is obtainable, but the elongation is low at a level of 180%.

In each of Ex. 2 and 7 to 11 wherein 30 parts by mass of hydrophobic silica was incorporated, the hardness is substantially equal to Ex. 1 and Ex. 12, and the elongation is superior to Ex. 1 and Ex. 12.

Among Ex. 2 and 7 to 11, particularly in Ex. 2, 7 or 8 wherein 30 parts by mass of silica 1, 2 or 3 hydrophobized with hexamethyldisilazane was incorporated, or in Ex. 9 wherein silica 4 hydrophobized with silicone oil was used, the elongation was as high as at least 250%, as compared with Ex. 10 or 11 wherein silica 5 or 6 hydrophobized with other treating agent was used.

Among Ex. 2 and 7 to 9, particularly in Ex. 2, 7 or 8 wherein silica 1, 2 or 3 hydrophobized with hexamethyldisilazane was used, the tensile strength is high as compared with Ex. 9 wherein silica 4 was used.

Further, among Ex. 2 and 7 to 9, particularly in Ex. 2 wherein silica 1 having an apparent specific gravity of 140 g/L was used, the minimum torque value (ML) is low, and the molding processability is excellent, as compared with Ex. 7 to 9 wherein silica 2 to 4 was used.

Further, from the comparison of Ex. 2 and 4 to 6 wherein silica 1 was used, it is evident that as the content of silica increases, the hardness tends to increase, and the elongation tends to decrease.

INDUSTRIAL APPLICABILITY

The cross-linked rubber article of the present invention is excellent in hardness, strength and elongation and has good heat resistance, acid resistance and oil resistance, and thus, it is useful for e.g. a rubber member (sealing member) for drilling. Further, it is useful for other applications such as oil seal for automobiles, sealing material for stem tubes, etc.

This application is a continuation of PCT Application No. PCT/JP2013/081072, filed on Nov. 18, 2013, which is based upon and claims the benefit of priority from Japanese Patent Application No. 2012-260956 filed on Nov. 29, 2012. The contents of those applications are incorporated herein by reference in their entireties.

What is claimed is:

1. A fluoro-rubber composition comprising:
a fluoro-rubber;
a hydrophobic silica in an amount of from 1 to 50 parts by mass per 100 parts by mass of the fluoro-rubber;
a cross-linking agent which is an organic peroxide, in an amount of from 0.1 to 5 parts by mass per 100 parts by mass of the fluoro-rubber;
a cross-linking assistant selected from the group consisting of triallyl cyanurate, triallyl isocyanurate, triacryl formal, triallyl trimellitate, dipropargyl terephthalate, diallyl phthalate, tetraallyl terephthalamide, triallyl phosphate, trimethallyl isocyanurate, 1,3,5-triacryloylhexahydro-1,3,5-triazin, m-phenylenediamine bismaleimide, p-quinone dioxime, p,p'-dibenzoylquinone dioxime, dipropargyl terephthalate, and N,N',N'',N'''-tetraallyl terephthalamide in an amount of from 0.1 to 30 parts by mass per 100 parts by mass of the fluoro-rubber; and
carbon black in an amount of from 1 to 50 parts by mass per 100 parts by mass c fluoro-rubber,
wherein the hydrophobic silica is one which is hydrophobized with hexamethyldisilazane and the hydrophobic silica has a specific surface of from 25 to 200 m$^2$/g.

2. The fluoro-rubber composition according to claim 1, wherein the hydrophobic silica has an average primary particle size of from 5 to 50 nm.

3. The fluoro-rubber composition according to claim 1, wherein the fluoro-rubber is at least one member selected from the group consisting of a vinylidene fluoride/hexafluoropropylene copolymer, a tetrafluoroethylene/propylene copolymer, a vinylidene fluoride/tetrafluoroethylene/hexafluoropropylene copolymer and a tetrafluoroethylene/propylene/vinylidene fluoride copolymer.

4. The fluoro-rubber composition according to claim 3, wherein the fluoro-rubber is a tetrafluoroethylene/propylene copolymer.

5. The fluoro-rubber composition according to claim 1, wherein the cross-linking assistant is at least one member selected from the group consisting of triallyl cyanurate, triallyl isocyanurate and trimethallyl isocyanurate.

6. A cross-linked rubber article obtained by cross-linking the fluoro-rubber composition as defined in claim 1.

7. The cross-linked rubber article according to claim 6, wherein the cross-linked rubber article is a rubber member for oil drilling.

8. The fluoro-rubber composition according to claim 1, wherein the amount of the cross-linking agent is from 0.5 to 3 parts by mass per 100 parts by mass of the fluoro-rubber.

9. The fluoro-rubber composition according to claim 1, wherein the amount of the hydrophobic silica is from 10 to 45 parts by mass per 100 parts by mass of the fluoro-rubber.

10. The fluoro-rubber composition according to claim 1, wherein the amount of the hydrophobic silica is from 20 to 40 parts by mass per 100 parts by mass of the fluoro-rubber.

11. The fluoro-rubber composition according to claim 1, wherein the hydrophobic silica is a dry silica.

12. The fluoro-rubber composition according to claim 5, wherein the amount of the cross-linking agent is from 0.5 to 3 parts by mass per 100 parts by mass of the fluoro-rubber.

13. The fluoro-rubber composition according to claim 11, wherein the hydrophobic silica has an average primary particle size of from 5 to 50 nm.

14. The fluoro-rubber composition according to claim 12, wherein the hydrophobic silica is a dry silica.

15. The fluoro-rubber composition according to claim 13, wherein the amount of the hydrophobic silica is from 20 to 40 parts by mass per 100 parts by mass of the fluoro-rubber.

16. The fluoro-rubber composition according to claim 14, wherein the hydrophobic silica has an average primary particle size of from 5 to 50 nm.

17. The fluoro-rubber composition according to claim 14, wherein the amount of the hydrophobic silica is from 20 to 40 parts by mass per 100 parts by mass of the fluoro-rubber.

18. The fluoro-rubber composition according to claim 16, wherein the amount of the hydrophobic silica is from 20 to 40 parts by mass per 100 parts by mass of the fluoro-rubber.

19. The fluoro-rubber composition according to claim 1, wherein the specific surface area of the hydrophobic silica is from 130 to 185 $m^2/g$.

* * * * *